(12) United States Patent
Tu (10) Patent No.: US 12,055,971 B1
(45) Date of Patent: Aug. 6, 2024

(54) DISPLAY BRACKET (71) Applicant: Shenzhen Feiyin Technology Co., Ltd., Shenzhen (CN)

(72) Inventor: Liansheng Tu, Shenzhen (CN)

( * ) Notice: Subject to any disclaimer, the term of this patent is extended or adjusted under 35 U.S.C. 154(b) by 0 days.

(21) Appl. No.: 18/431,715

(22) Filed: Feb. 2, 2024

(30) Foreign Application Priority Data

Jan. 16, 2024 (CN) .......................... 202420104048.6

(51) Int. Cl.
*G06F 1/16* (2006.01)
*F16M 11/08* (2006.01)
*F16M 13/02* (2006.01)

(52) U.S. Cl.
CPC ........... *G06F 1/1607* (2013.01); *F16M 11/08* (2013.01); *F16M 13/02* (2013.01); *F16M 2200/08* (2013.01); *G06F 1/1649* (2013.01)

(58) Field of Classification Search
CPC .... G06F 1/1607; G06F 1/1641; G06F 1/1647; G06F 1/1649
See application file for complete search history.

(56) References Cited

U.S. PATENT DOCUMENTS

| 10,817,020 B1* | 10/2020 | DeMaio | G06F 3/1423 |
| 2011/0298690 A1* | 12/2011 | Reilly | G06F 1/1649 345/1.1 |
| 2023/0200529 A1* | 6/2023 | Vlaar | A47B 23/043 248/371 |

* cited by examiner

*Primary Examiner* — Anthony Q Edwards (57) ABSTRACT

A display bracket includes a base and a first support component. The base is used for placing a laptop. The first support component is located on one side of the base, and the first support component is capable of rotating along a transverse length direction of the base. A back of the first support component is provided with a fixing device for installing an extended screen. The extended screen can be installed on the first support component through the fixing device on the first support component, and the laptop can be placed on the base. When the extended screen is installed on the first support component, an extension of a display of the laptop can be realized without a need to install the extended screen on the laptop display, so as not to damage the laptop and greatly improve user experience.

20 Claims, 9 Drawing Sheets

DISPLAY BRACKET

CROSS-REFERENCE TO RELATED APPLICATIONS

The application claims priority of Chinese patent application CN2024201040486, filed on Jan. 16, 2024, which is incorporated herein by reference in its entireties.

TECHNICAL FIELD

The present invention relates to a bracket, in particular to a display bracket in a field of electronic accessory technology.

BACKGROUND ART

In existing technology, a terminal has become an essential item in people's lives, and with a growth of people's needs, an extended screen has also emerged. In the past, a screen size of terminal product such as a laptop and a desktop display had already been determined in production process. However, in practical applications, it is difficult to meet the needs of consumers for multiple screens or large screens. The laptop, in particular, is not capable of being watched by multiple people due to a relatively small screen. Therefore, to meet the needs of consumers, split-screen display technology is usually used to achieve multi-screen display effects.

Nowadays, the extended screen is basically installed on a laptop display. One method is to clamp the extended screen on the display of the laptop, which is easy to scratch the laptop and a scratched area is difficult to repair. Another method is to install the extended screen on a back of the laptop display through adhesive. This adhesive method is not very stable, and the extended screen is difficult to remove from the laptop, and the adhesive on the laptop is also difficult to remove. Therefore, using the above two methods to install the extended screen has brought inconvenience to users and greatly reduced user experience.

SUMMARY

To solve a problem that the methods of clamping or using adhesive to install an extended screen on a display of a laptop in existing technology mentioned above can easily cause damage to the laptop and cause inconvenience to a user, a display bracket is provided in the present invention. The extended screen can be installed on a first support component through a first fixing device on the first support component, and the laptop can be placed on a base. When the extended screen is installed on the first support component, an extension of the laptop display can be realized without a need to install the extended screen on the laptop display, so that the laptop will not be damaged, and user experience is greatly improved.

A technical solution adopted by the present invention to solve its technical problem is a display bracket. The display bracket includes a base and a first support component. The base is used for placing a laptop. The first support component is arranged on one side of the base, and the first support component is capable of rotating along a transverse length direction of the base. A back of the first support component is provided with a first fixing device for installing an extended screen.

Furthermore, the base includes a first support seat, a second support seat, and a first connection component. The first support component is located on one side of the first support seat. The first support seat is rotatably connected to the second support seat through the first connection component, and the second support seat is capable of supporting the first support seat through the first connection component. When the second support seat supports the first support seat, one end of the first support seat equipped with the first support component is capable of being moved away from the second support seat via a rotation of the first support seat.

Furthermore, one end of the first connection component is rotatably connected to an end of the first support seat opposite to one end of the first support seat equipped with the first support component, and an other end of the first connection component is rotatably connected to one end of the second support seat. The second support seat is capable of rotating to a lower part of the first support seat. The first support component is capable of rotating to a back of the first support seat. When the first support component rotates to the back of the first support seat, the second support seat is capable of being stacked on the first support component.

Furthermore, the first connection component includes a first connector, a second connector, and a third connector. One end of the first connector is fixedly set at a bottom of the first support seat, and the first connector is located at an opposite end of the first support component. One end of the second connector is fixedly set at one end of the second support seat. An other end of the first connector and an other end of the second connector are both connected to the third connector through damping rotation.

Furthermore, the display bracket further includes a second support component, and the second support component is capable of supporting one end of the first support seat equipped with the first support component. One end of the second support component is rotatably set at the end of the first support seat equipped with the first support component. When the first support component rotates to a back of the first support seat, the second support component is also capable of rotating to the back of the first support seat, and the second support seat is capable of being stacked on top of the first support component and the second support component.

Furthermore, the first support component includes support rods and a support plate. One end of the support rods is rotatably connected to the base. The support plate is provided at an other end of the support rods, and the support plate is rotatably connected to the support rods. The first fixing device is provided on a back of the support plate.

Furthermore, the support plate is rotatable around a width extension direction of the support rods.

Furthermore, the first fixing device includes sliding groove components. The sliding groove components are used for receiving a connector provided on an extended screen.

Furthermore, a total number of the sliding groove components is two, and the two sliding groove components are respectively located on both sides of a transverse center of a support plate.

Furthermore, a side of the base connected to the support rods is provided with a notch, and the notch is inward concave. Both sides of the notch are equipped with the support rods, and the support plate is rotatably connected to the two support rods.

Furthermore, the sliding groove components include a first sliding groove and a second sliding groove, with the first sliding groove and the second sliding groove respectively located at both ends of a longitudinal width of the support plate.

Furthermore, the first fixing device further includes bayonets. The bayonets are set on the support plate and is located between the first sliding groove and the second sliding groove. The bayonets are used for engaging with a fixture block on a second fixing device of an extended screen.

Furthermore, blocking members are provided on an opposite side of the first support component on the first support seat. The blocking members are used for blocking a laptop placed on the first support seat from sliding.

Furthermore, the first support seat is equipped with more than one anti-slip mat on one side, and the side is used for placing a laptop.

Furthermore, corner pads are installed at corners of the second support seat.

Furthermore, the display bracket further includes a fourth connector. One end of the second support component, one end of the first support seat, and one end of the first support component are all connected to the fourth connector through damping rotation.

Furthermore, the blocking members are provided at both ends of an opposite side of the first support component, and both the blocking members are covered with blocking member sleeves.

Furthermore, both the first support seat and the second support seat are equipped with more than one through hole.

Furthermore, an extended screen includes the display bracket mentioned above, and the extended screen further includes an extended screen body and a second fixing device capable of supporting the extended screen body. The second fixing device is arranged on one side of the display bracket. One end of the second fixing device is hinged to the display bracket, and an other end of the second fixing device is capable of engaging with the first fixing device.

Furthermore, a fixture block is provided on the second fixing device, and the fixture block is used for engaging with the bayonets provided on the first fixing device. The fixture block has a curved protrusion.

The display bracket is provided in the present invention. The extended screen is capable of being installed on the first support component through the first fixing device on the first support component, and the laptop can be placed on the base. When the extended screen is installed on the first support component, an extension of a display of the laptop can be realized without a need to install the extended screen on the laptop display, so that the laptop will not be damaged and user experience is greatly improved. The first support seat is rotatable, and by adjusting a tilt angle of the first support seat, a use angle of the laptop placed on the first support seat is adjusted, making it convenient for the user to use the laptop. The first support component, the second support component, the first support seat, and the second support seat are capable of being stacked, facilitating the user to store the display bracket. Using the sliding grooves in the first fixing device makes it easier for the user to install the extended screen.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

Reference numerals: display bracket 100; base 1; first support seat 11; second support seat 12; first connection component 13; first connector 131; second connector 132; third connector 133; notch 14; blocking member 15; anti-slip mat 16; through hole 101; first support component 2; support rod 22; support plate 23; first fixing device 21; sliding groove component 211; first sliding groove 212; second sliding groove 213; bayonet 214; corner pad 121; second support component 3; fourth connector 4; extended screen 500; second fixing device 501 of the extended screen; fixture block 502 on the second fixing device 501; laptop 600.

DETAILED DESCRIPTION OF THE EMBODIMENTS

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the said features. In the description of embodiments of the application, "a plurality of" means two or more, unless otherwise specifically defined.

Figure 1:
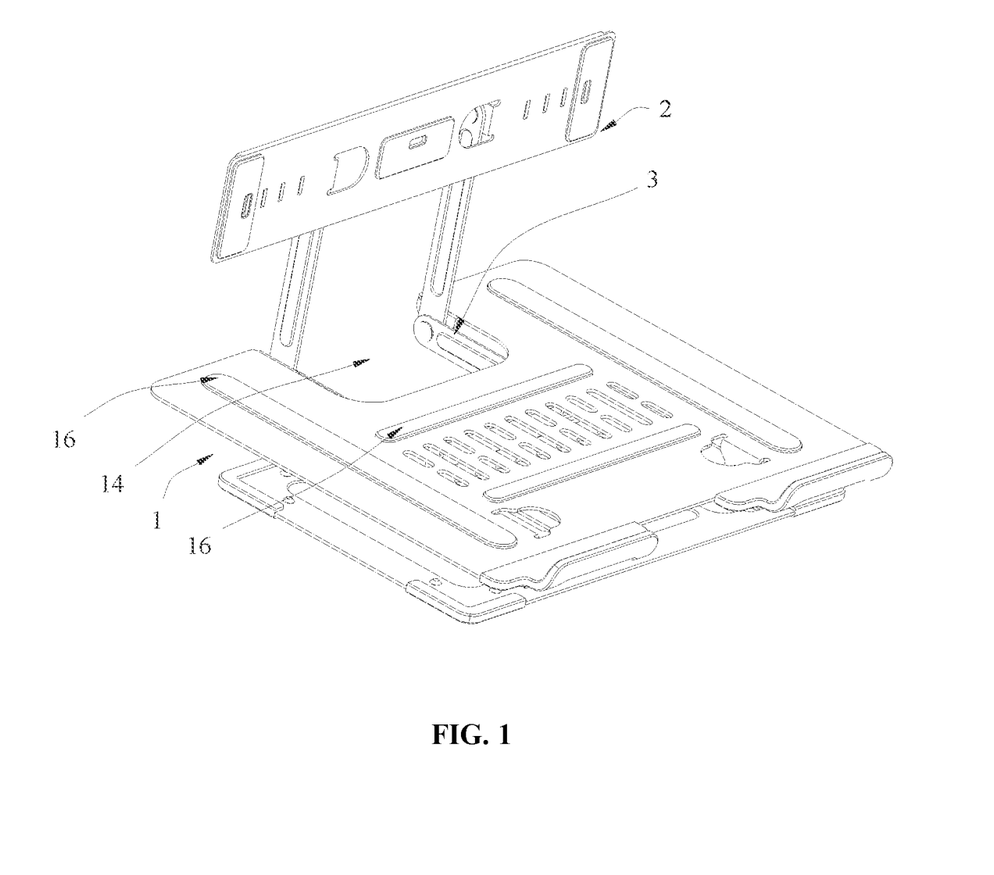
FIG. 1 is a perspective view of a display bracket according to the present invention.

Referring to FIGS. 1-14, a display bracket is provided in the present invention. As shown in FIG. 1, the display bracket 100 includes a base 1 and a first support component 2.

Figure 2:
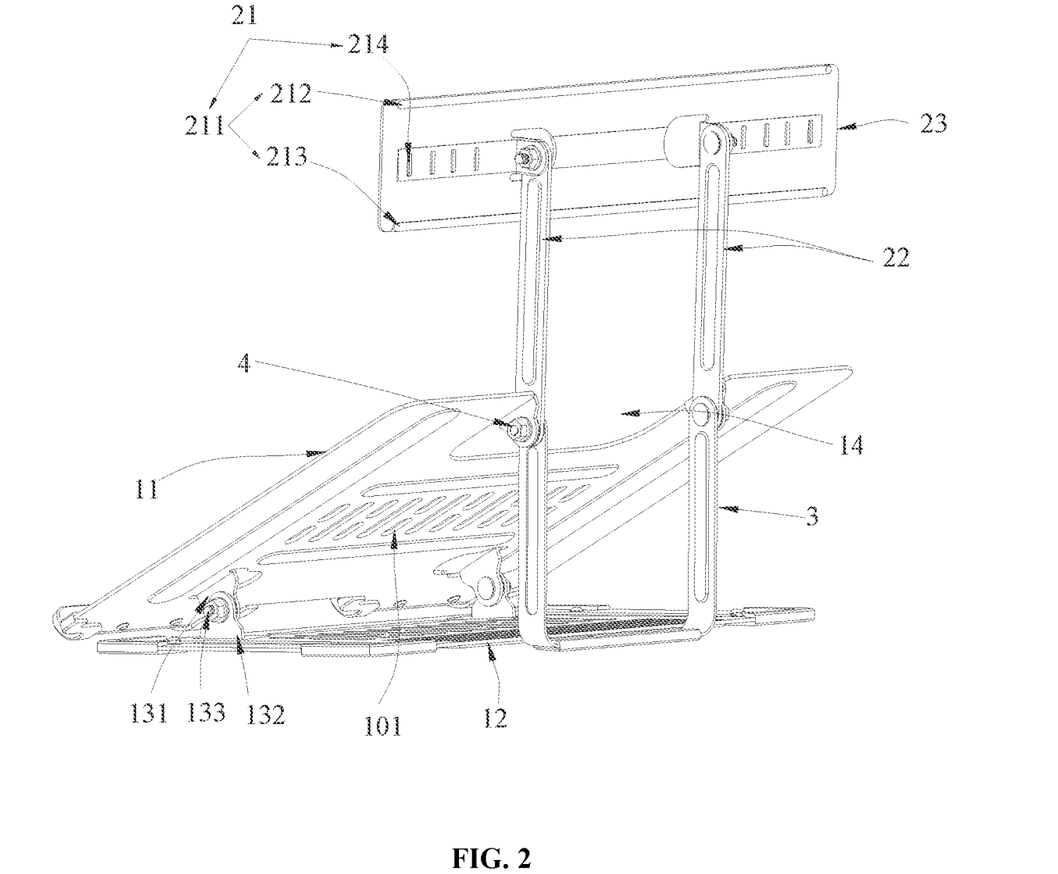
FIG. 2 is a diagram of a display bracket in an unfolded state according to the present invention.
Figure 3:
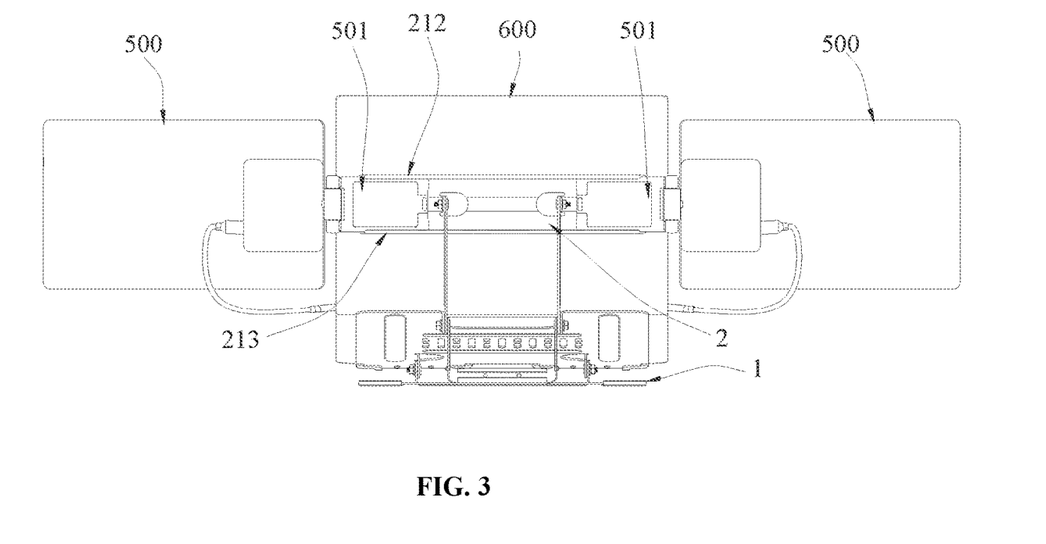
FIG. 3 is a back diagram of a display bracket equipped with two extended screens when being used according to the present invention.

As shown in FIG. 3, the base 1 is used for placing a laptop 600. As shown in FIG. 3, the first support component 2 is set on one side of the base 1, and the first support component 2 is capable of rotating along a transverse length direction of the base 1. As shown in FIGS. 2-3, a back of the first support component 2 is equipped with a first fixing device 21 for installing an extended screen 500. That is to say, the extended screen is capable of being installed on the first support component through the fixing device on the support component, and the laptop can be placed on the base. When the extended screen is installed on the first support component, an extension of a display of the laptop can be realized without a need to install the extended screen on the laptop display, so that the laptop will not be damaged and user experience is greatly improved. When the extended screen is not used, the bracket is also capable of being used separately, greatly increasing practicality of the display bracket.

The first fixing device 21 in this embodiment can be in a form of a buckle, a locking form, or sliding groove components 211. As shown in FIG. 2, the preferred first fixing device 21 in this embodiment includes the sliding groove components 211, and the sliding groove components 211 are used for receiving a second fixing device 501 on the extended screen 500. Compared with the buckle form and the locking form, the second fixing device 501 of the extended screen 500 is directly inserted into the sliding groove, making it more convenient for a user to install the extended screen, and a structure of the sliding groove is simpler.

Figure 4:
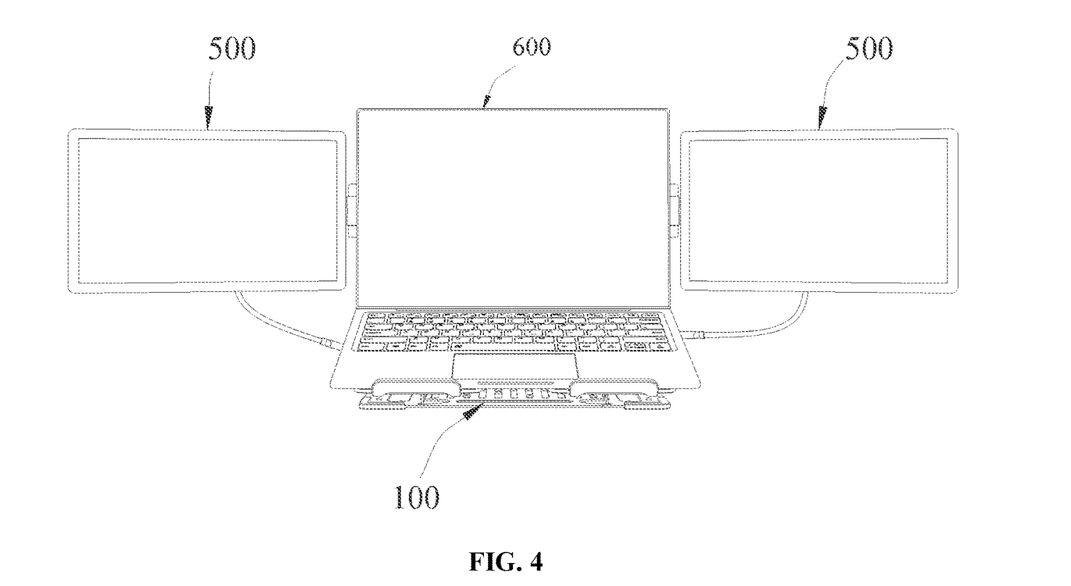
FIG. 4 is a front diagram of a display bracket equipped with two extended screens when being used according to the present invention.
Figure 5:
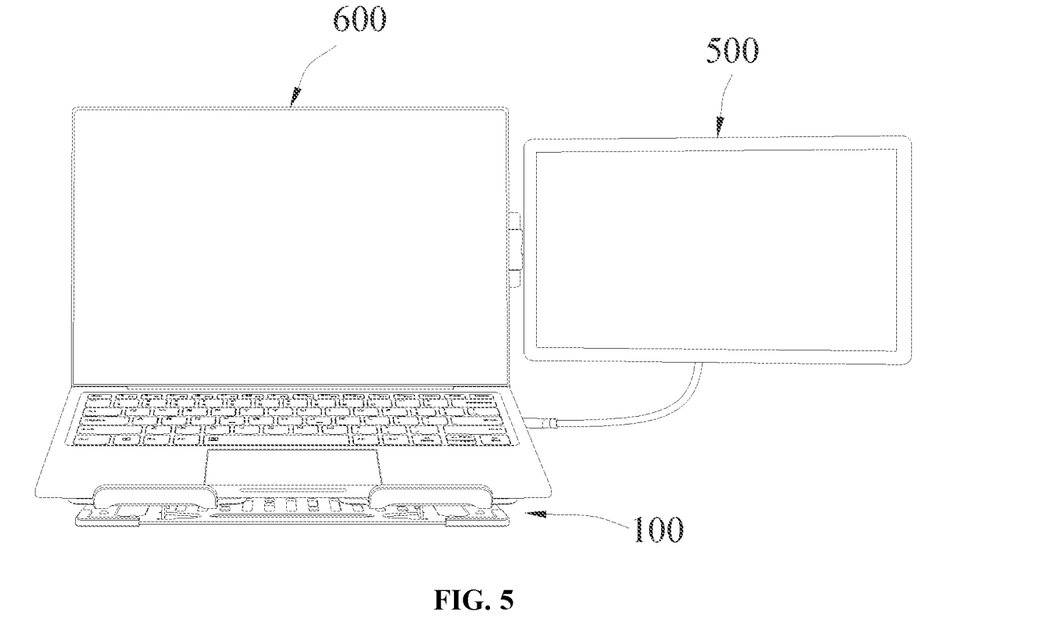
FIG. 5 is a front diagram of a display bracket equipped with one extended screen when being used according to the present invention.
Figure 6:
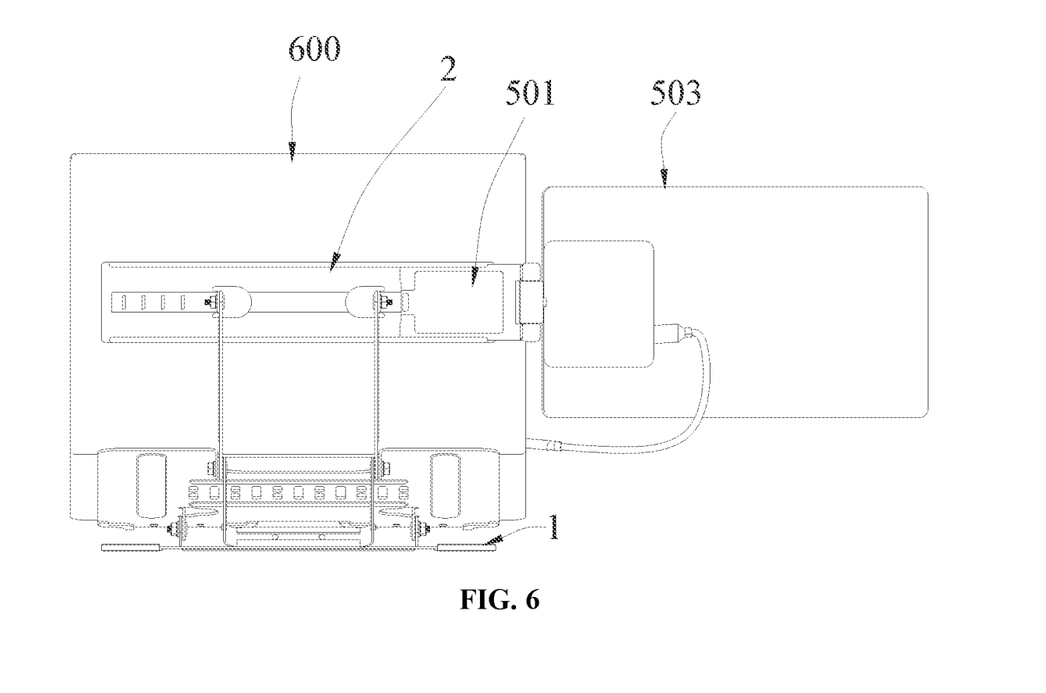
FIG. 6 is a back diagram of a display bracket equipped with one extended screen when being used according to the present invention.

In this embodiment, as shown in FIG. 2, a total number of the sliding groove components 211 is two, and the two sliding groove components 211 are respectively located on two opposite sides of a transverse center of a support plate 23. This configuration allows for an installation of two extended screens. As shown in FIG. 4, with an addition of a laptop display, three displays are achieved. However, although two sliding groove components 211 are provided, one extended screen can also be installed as shown in FIGS. 5-6, providing convenience for the user, increasing practicality of the display bracket, and enhancing user experience.

In this embodiment, as shown in FIG. 3, the sliding groove components 211 include a first sliding groove 212 and a second sliding groove 213, with the first sliding groove 212 and the second sliding groove 213 respectively located at both ends of a longitudinal width of the support plate 23. In this way, two ends of the second fixing device 501 of the extended screen 500 are capable of being directly inserted into the first sliding groove 212 and the second sliding groove 213. Therefore, the second fixing device 501 of the extended screen 500 only needs to be set with two opposite sides being parallel, thereby facilitating a design of the second fixing device 501 of the extended screen 500.

Figure 14:
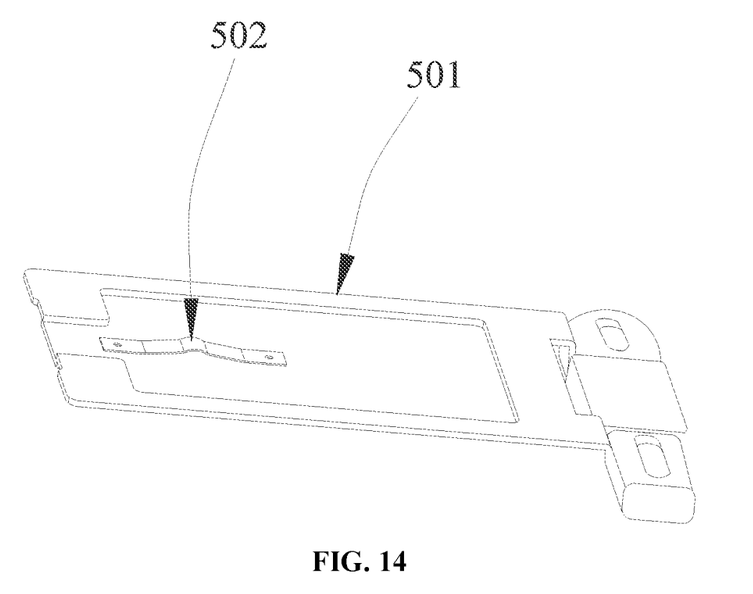
FIG. 14 is a perspective view of a second fixing device according to the present invention.

In this embodiment, as shown in FIG. 2, the first fixing device 21 further includes bayonets 214. The bayonets 214 are set on the support plate 23 and are located between the first sliding groove 212 and the second sliding groove 213. The bayonets 214 are used for engaging with the fixture block 502 on the second fixing device 501 of the extended screen 500, making it more stable when the extended screen 500 is installed on the first support component. The fixture block 502 is shown in FIG. 14 and has a curved surface as a whole, making it easy to install and engage.

In this embodiment, as shown in FIG. 2, the base 1 includes a first support seat 11, a second support seat 12, and a first connection component 13. The first support component 2 is located on one side of the first support seat 11. The first support seat 11 is rotatably connected to the second support seat 12 through the first connection component 13. The second support seat 12 is capable of supporting the first support seat 11 through the first connection component 13. When the second support seat 12 supports the first support seat 11, one end of the first support seat 11 equipped with the first support component 2 is capable of being moved away from the second support seat 12 via a rotation of the first support seat 11. In this way, an inclination of the first support seat 11 is capable of being adjusted, and a height of the first support component 2 is also capable of being adjusted. That is to say, by adjusting the inclination of the first support seat 11 to adjust a use angle of the laptop placed on the first support seat 11, the user can adjust an angle of the bracket according to the user's own usage habits.

In this embodiment, as shown in FIG. 2, one end of the first connection component 13 is rotatably connected to an end of the first support seat 11 opposite to one end of the first support seat 11 equipped with the first support component 2, and the other end of the first connection component 13 is rotatably connected to one end of the second support seat 12. The second support seat 12 is capable of rotating to a lower part of the first support seat 11. The first support component 2 is capable of rotating to a back of the first support seat 11. When the first support component 2 rotates the back of the first support seat 11, the second support seat 12 is capable of being stacked on the first support component 2, facilitating the user to store the display bracket. FIGS. 7-12 show a folding process of the display bracket.

In this embodiment, as shown in FIG. 2, the first connection component 13 includes a first connector 131, a second connector 132, and a third connector 133. One end of the first connector 131 is fixedly set at a bottom of the first support seat 11, and the first connector 131 is located at an opposite end of the first support component 2. One end of the second connector 132 is fixedly set at one end of the second support seat 12. The other end of the first connector 131 and the other end of the second connector 132 are both connected to the third connector 133 through damping rotation. This structure is simple and practical, easy to assemble, and the damping rotation is convenient to set, with simple and uncomplicated processes.

Figure 7:
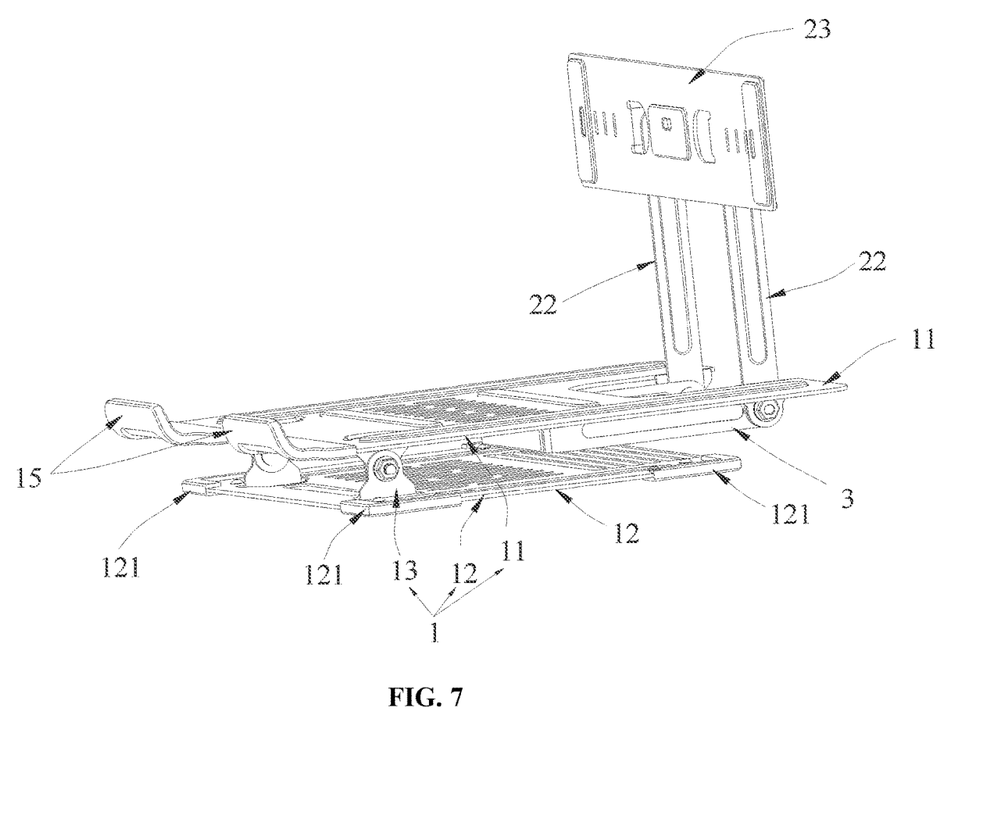
FIG. 7 is a perspective view of a display bracket according to the present invention.

In this embodiment, as shown in FIG. 7, the first support component 2 includes support rods 22 and a support plate 23. One end of the support rods 22 is rotatably connected to the base 1, and the support plate 23 is provided at the other end of the support rods 22. The support plate 23 is rotatably connected to the support rods 22. The first fixing device 21 is provided on a back of the support plate 23. A structural design of the support rods 22 and the support plate 23 is simple and practical, and the support rods have light weight, good bearing capacity and convenient installation. In this embodiment, the support plate 23 is rotatable around a lengthwise direction of the support rods, and the support plate 23 is also rotatable around a width extension direction of the support rods, facilitating the user to adjust an angle of the extended screen. In this embodiment, the support plate 23 is preferably rotatable around the width extension direction of the support rods, and can achieve a rotation of 360 degrees. In this way, a display of the extended screen can be viewed from a front of the laptop, or be viewed from a back of the laptop after the support plate 23 is rotated. This setting extends an overall range of use of the display bracket, making it more convenient for the user to use the display bracket and greatly improving user experience.

In this embodiment, as shown in FIG. 2, a side of the base 1 connected to the support rods 22 is provided with a notch 14, and the notch 14 is inward concave. Both sides of the notch 14 are equipped with the support rods 22, and the support plate 23 is rotatably connected to the two support rods 22. The notch in this embodiment is set in a middle of a width of the base 1, and a depth of the notch is designed to be about one-third of a length of the base 1. A design of the notch 14 is mainly to reduce a weight of the display bracket and to use the two support rods 22 to support the extended screen more stably.

In this embodiment, as shown in FIG. 2, both the first support seat 11 and the second support seat 12 are equipped with more than one through hole 101. It's possible that only one through hole is set in a middle of the first support seat 11 and the second support seat 12, but the through hole needs to be set larger to reduce a weight of the display bracket and facilitate the user to carry. Alternatively, a plurality of through holes can be set, and the through holes can be in some shapes, such as butterfly shape, or irregular shape, etc., so as to make the display bracket look more designed, but a setting of the through holes is mainly to reduce the weight of the display bracket.

In this embodiment, as shown in FIG. 7, blocking members 15 are provided on an opposite side of the first support component 2 on the first support seat 11. The blocking members 15 are used for blocking the laptop placed on the first support seat 11 from sliding, making the laptop more stable and safer to use when the laptop is placed on the first support seat 11.

In this embodiment, the blocking members 15 are provided at both ends of the opposite side of the first support component 2, and both the blocking members 15 are covered with blocking member sleeves. The blocking member sleeves are silicone sleeves or rubber sleeves. The silicone sleeves or the rubber sleeves are non-slip and collision resistant, increasing safety of the display bracket during use.

In this embodiment, as shown in FIG. 1, more than one anti-slip mat 16 is provided on a support surface of the first support seat 11, making the laptop more stable and will not slide when placed on the first support seat 11, increasing user experience.

In this embodiment, as shown in FIG. 7, corner pads 121 are installed at corners of the second support seat 12. The corner pads 121 are silicone pads or rubber pads. The silicone pads or the rubber pads are non-slip and collision resistant, increasing safety of the display bracket during use.

In this embodiment, as shown in FIG. 2, the display bracket 100 further includes a second support component 3. The second support component 3 is rotatably set at one end of the first support seat 11 equipped with a first support component 2. When the first support seat 11 and the second support seat 12 form a certain support angle, the second support component 3 is capable of supporting the end of the first support seat 11 equipped with the first support component 2. When the first support component 2 rotates to a back of the first support seat 11, the second support component 3 is also capable of rotating to the back of the first support seat 11, and the second support seat 12 is capable of being stacked on top of the first support component 2 and the second support component 3. That is to say, the second support component 3 is capable of sharing some of pressure on support component for the end of the first support seat 11 equipped with the first support component 2, so as to prevent damage to the display bracket caused by inability of the end of the first support seat 11 equipped with the first support component 2 to withstand gravity of an extended display screen.

Figure 10:
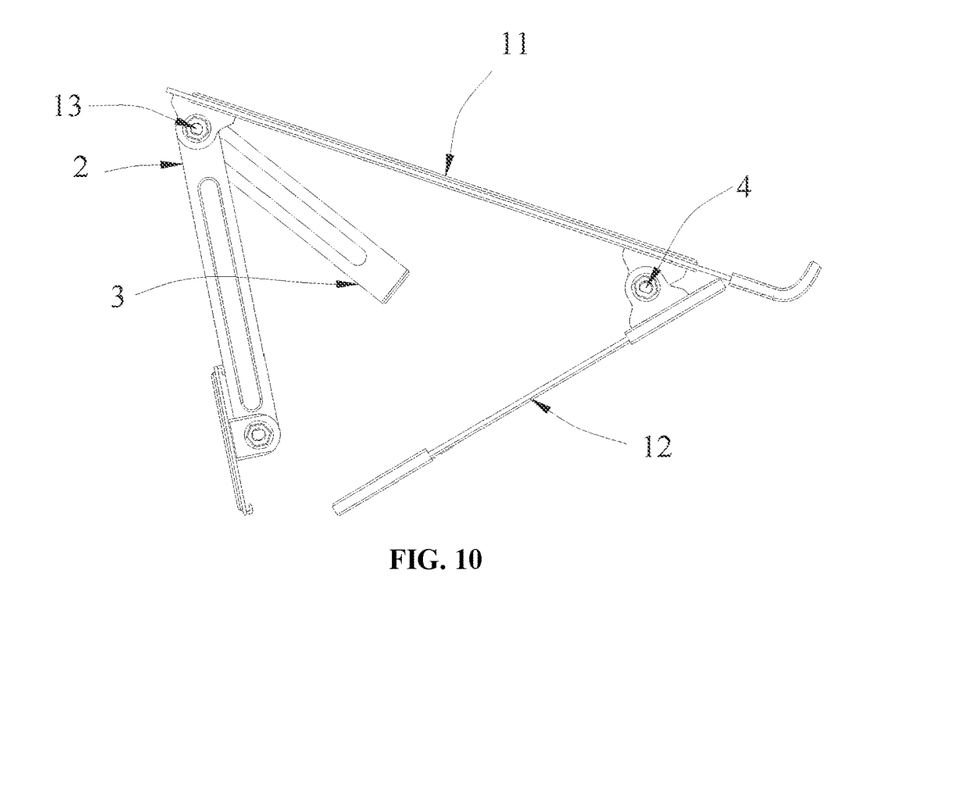
FIG. 10 is a side view of a folding process 2 of a display bracket according to the present invention.
Figure 11:
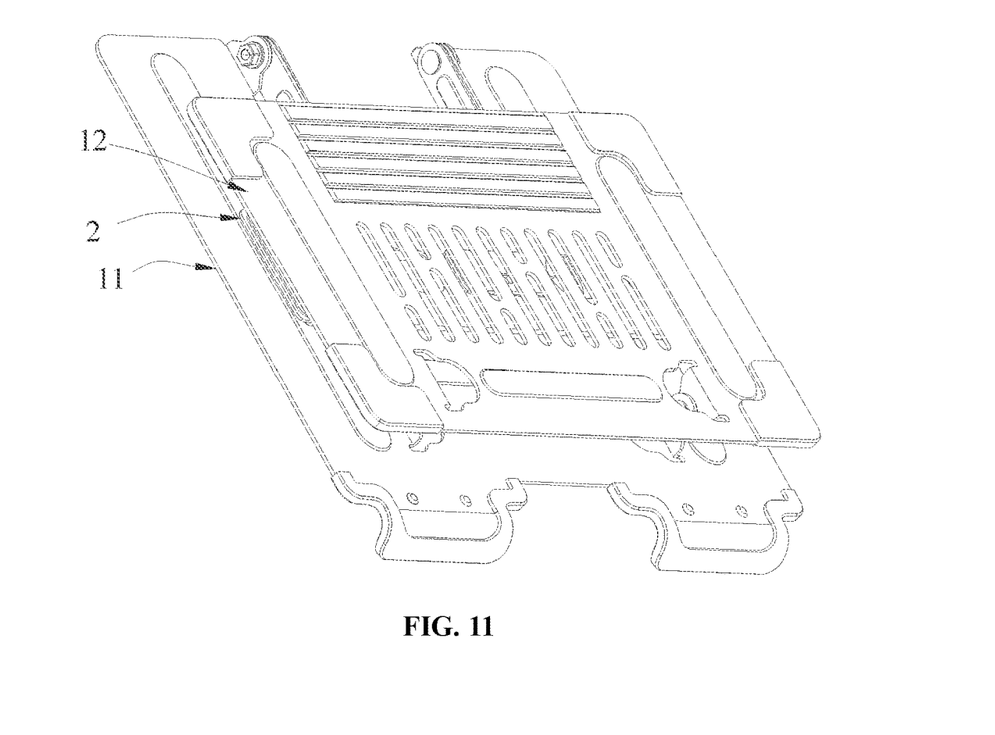
FIG. 11 is a perspective view of a display bracket in a folding storage state according to the present invention.
Figure 12:
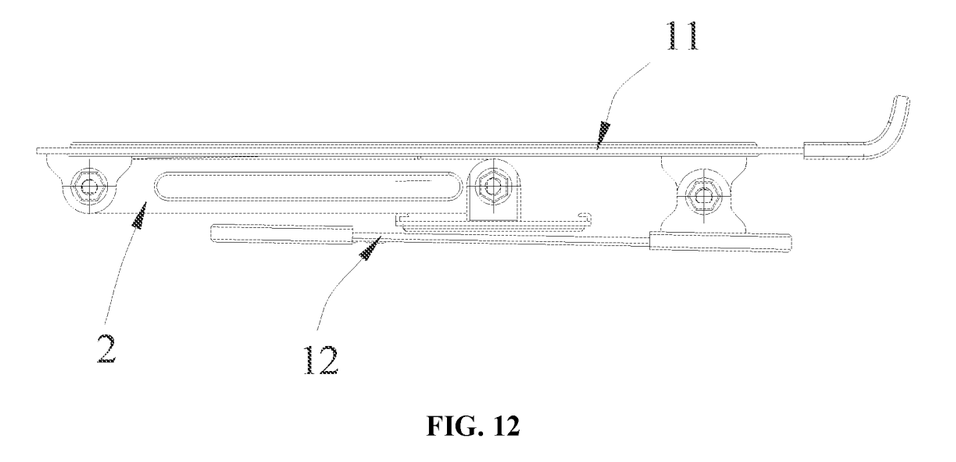
FIG. 12 is a side view of a display bracket in a folding storage state according to the present invention.

In this embodiment, as shown in FIGS. 2 and 10, the display bracket 100 further includes a fourth connector 4. One end of the second support component 3, one end of the first support seat 11, and one end of the first support component 2 are all connected to the fourth connector 4 through damping rotation, thereby making a structure simpler, reducing processes, and saving costs.

Figure 8:
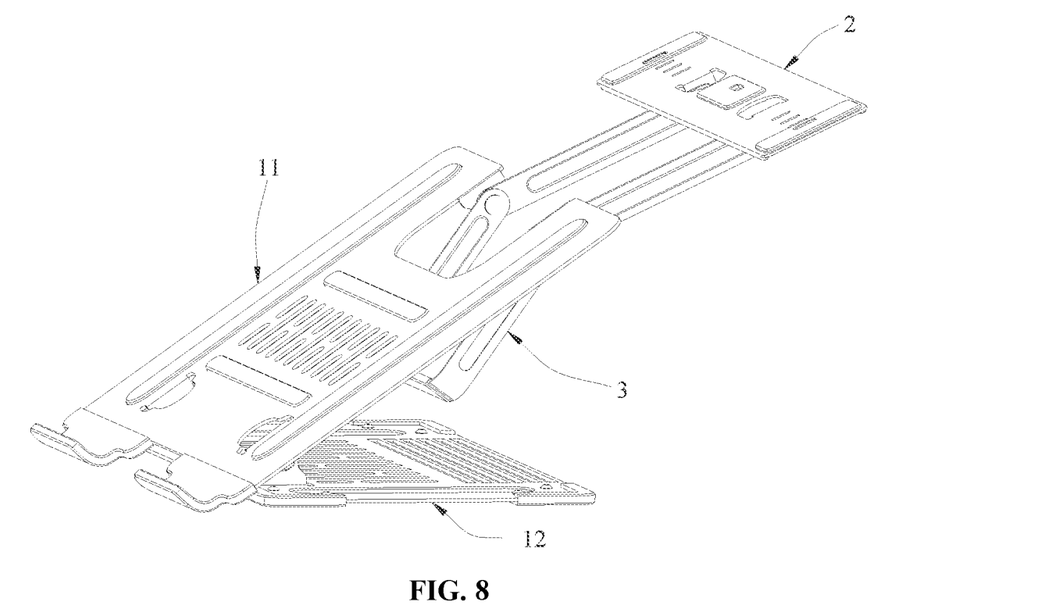
FIG. 8 is a diagram of a folding process 1 of a display bracket according to the present invention.
Figure 9:
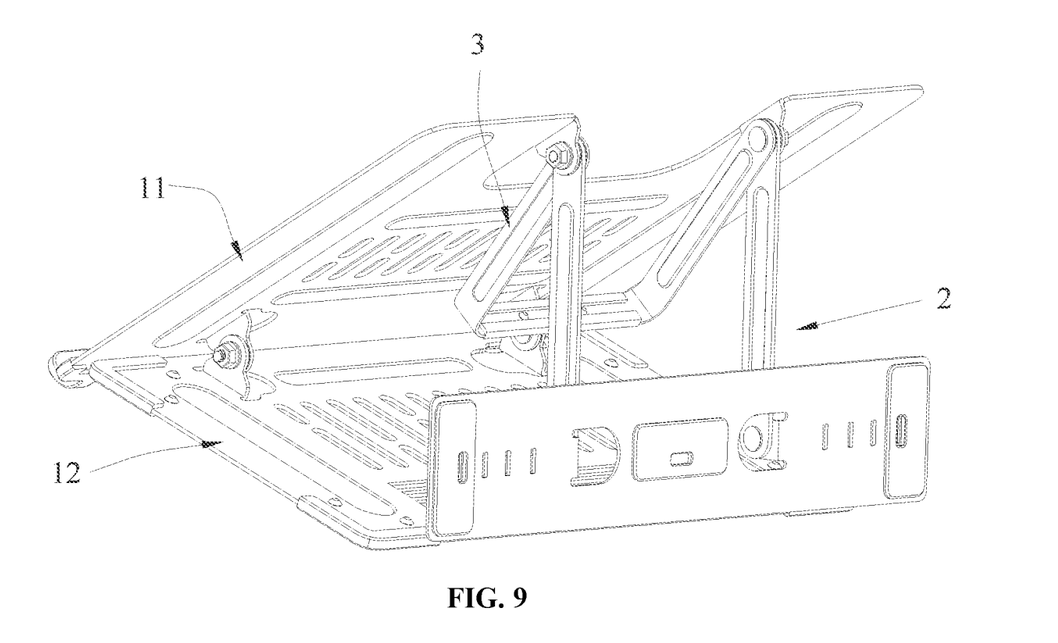
FIG. 9 is a diagram of a folding process 2 of a display bracket according to the present invention.

In this embodiment, as shown in FIGS. 2 and 8, the second support component 3 is set in a U-shape, and a width of the U-shape is set to be smaller than a width of the two support rods. Therefore, the second support component 3 is capable of being rotated between the two support rods. This setting can make the display bracket thinner after being folded, reducing storage space, and facilitating the user to carry.

Figure 13:
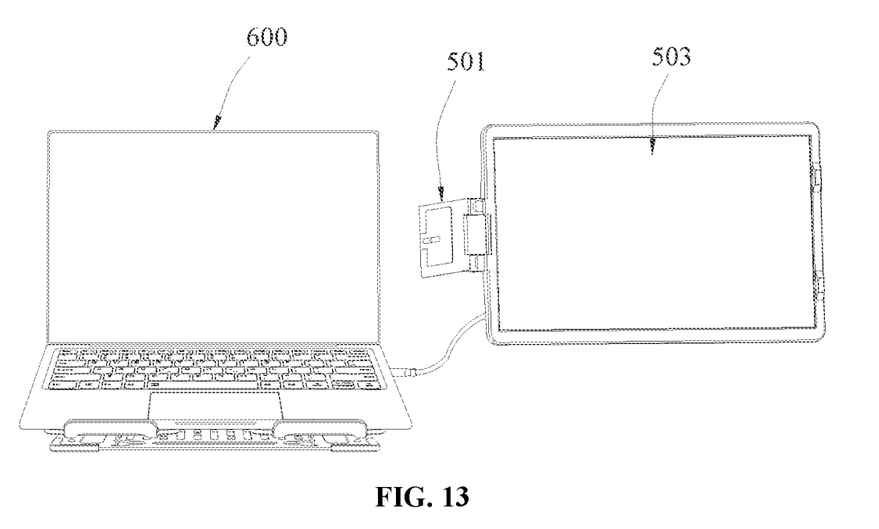
FIG. 13 is a state diagram of an extended screen when being used alone according to the present invention.

In this embodiment, an extended screen includes all features mentioned above in the display bracket 100. As shown in FIGS. 3-6, the extended screen 500 further includes an extended screen body 503 and a second fixing device 501 capable of supporting the extended screen body 503. In this embodiment, the second fixing device 501 being capable of supporting the extended screen body 503 means that the extended screen body 503 can be supported on a platform, such as a ground, a desktop, or other relatively flat platforms. The second fixing device 501 is arranged on one side of the display bracket 100. One end of the second fixing device 501 is hinged to the display bracket 100, facilitating the user to adjust a viewing angle. The other end of the second fixing device 501 is capable of engaging with the first fixing device 21, therefore a setting of the second fixing device enables the extended screen to be hung on the display bracket. When the user does not want to hang the extended screen on the display bracket, as shown in FIG. 13, the extended screen is also capable of being placed separately on a platform for use, making the extended screen be used more conveniently. But the display bracket in this embodiment is more convenient for the user to use the extended screen, allowing a display of the laptop and a display of the extended screen to be placed on a same plane for viewing.

In this embodiment, a fixture block 502 is provided on the second fixing device 501, the fixture block is used for engaging with the bayonets 214 provided on the first fixing device 21, making the second fixing device 501 more stable when installed on the first fixing device 21. The fixture block 502 has a curved protrusion, making it more convenient for the engaging between the fixture block and the bayonets.

Overall, the display bracket in this embodiment solves the problem described in background technology, and the display bracket in this embodiment is also capable of being used as a laptop bracket alone when the extended screen is not used. A structural design of the display bracket in this embodiment is simple and highly practical, greatly improving user experience. The second fixing device of the extended screen is rotatably connected to the extended screen body. When the extended screen is installed on the display bracket, it is convenient for the user to adjust a viewing angle of the extended screen. Moreover, the second fixing device of the extended screen is capable of being placed on a platform when the extended screen is used alone, greatly improving a range of use of the extended screen.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A display bracket, comprising:
   a base being used for placing a laptop; and
   a first support component, wherein the first support component is arranged on one side of the base, and the first support component is capable of rotating along a transverse length direction of the base; wherein a back of the first support component is provided with a first fixing device for installing an extended screen.

2. The display bracket of claim 1, wherein the base comprises a first support seat, a second support seat, and a first connection component; the first support component is located on one side of the first support seat, and the first support seat is rotatably connected to the second support seat through the first connection component, and the second support seat is capable of supporting the first support seat through the first connection component; wherein when the second support seat supports the first support seat, one end of the first support seat equipped with the first support component is capable of being moved away from the second support seat via a rotation of the first support seat.

3. The display bracket of claim 2, wherein one end of the first connection component is rotatably connected to an end of the first support seat opposite to one end of the first support seat equipped with the first support component, and an other end of the first connection component is rotatably connected to one end of the second support seat, and the second support seat is capable of rotating to a lower part of the first support seat; wherein the first support component is capable of rotating to a back of the first support seat, and when the first support component rotates to the back of the first support seat, the second support seat is capable of being stacked on the first support component.

4. The display bracket of claim 3, wherein the first connection component comprises a first connector, a second connector, and a third connector; one end of the first connector is fixedly set at a bottom of the first support seat, and the first connector is located at an opposite end of the first support component; wherein one end of the second connector is fixedly set at one end of the second support seat, and an other end of the first connector and an other end of the second connector are both connected to the third connector through damping rotation.

5. The display bracket of claim 3, wherein the display bracket further comprises a second support component, and the second support component is capable of supporting one end of the first support seat equipped with the first support component; one end of the second support component is rotatably set at the end of the first support seat equipped with the first support component, and when the first support component rotates to a back of the first support seat, the second support component is also capable of rotating to the back of the first support seat, and the second support seat is capable of being stacked on top of the first support component and the second support component.

6. The display bracket of claim 1, wherein the first support component comprises support rods and a support plate; one end of the support rods is rotatably connected to the base, and the support plate is provided at an other end of the support rods, and the support plate is rotatably connected to the support rods; the first fixing device is provided on a back of the support plate.

7. The display bracket of claim 6, wherein the support plate is rotatable around a width extension direction of the support rods.

8. The display bracket of claim 6, wherein the first fixing device comprises sliding groove components, and the sliding groove components are used for receiving a second fixing device provided on an extended screen.

9. The display bracket of claim 7, wherein a total number of the sliding groove components is two, and the two sliding groove components are respectively located on both sides of a transverse center of the support plate.

10. The display bracket of claim 6, wherein a side of the base connected to the support rods is provided with a notch, and the notch is inward concave; both sides of the notch are equipped with the support rods, and the support plate is rotatably connected to the two support rods.

11. The display bracket of claim 8, wherein the sliding groove components comprise a first sliding groove and a second sliding groove, with the first sliding groove and the second sliding groove respectively located at both ends of a longitudinal width of the support plate.

12. The display bracket of claim 11, wherein the first fixing device further comprises bayonets; the bayonets are set on the support plate and are located between the first sliding groove and the second sliding groove; the bayonets are used for engaging with a fixture block on a second fixing device of an extended screen.

13. The display bracket of claim 2, wherein blocking members are provided on an opposite side of the first support component on the first support seat, and the blocking members are used for blocking a laptop placed on the first support seat from sliding.

14. The display bracket of claim 2, wherein the first support seat is equipped with more than one anti-slip mat on one side, and the side is used for placing a laptop.

15. The display bracket of claim 2, wherein corner pads are installed at corners of the second support seat.

16. The display bracket of claim 5, wherein the display bracket further comprises a fourth connector; one end of the second support component, one end of the first support seat, and one end of the first support component are all connected to the fourth connector through damping rotation.

17. The display bracket of claim 13, wherein the blocking members are provided at both ends of an opposite side of the first support component, and both the blocking members are covered with blocking member sleeves.

18. The display bracket of claim 2, wherein both the first support seat and the second support seat are equipped with more than one through hole.

19. An extended screen, comprising:
    the display bracket of claim 1, and
    the extended screen further comprising:
    an extended screen body; and a second fixing device capable of supporting the extended screen body;
wherein the second fixing device is arranged on one side of the display bracket, and one end of the second fixing device is hinged to the display bracket, and an other end of the second fixing device is capable of engaging with the first fixing device.

20. The extended screen of claim 19, wherein a fixture block is provided on the second fixing device, and the fixture block is used for engaging with the bayonets provided on the first fixing device; the fixture block has a curved protrusion.

\* \* \* \* \*